2,526,543

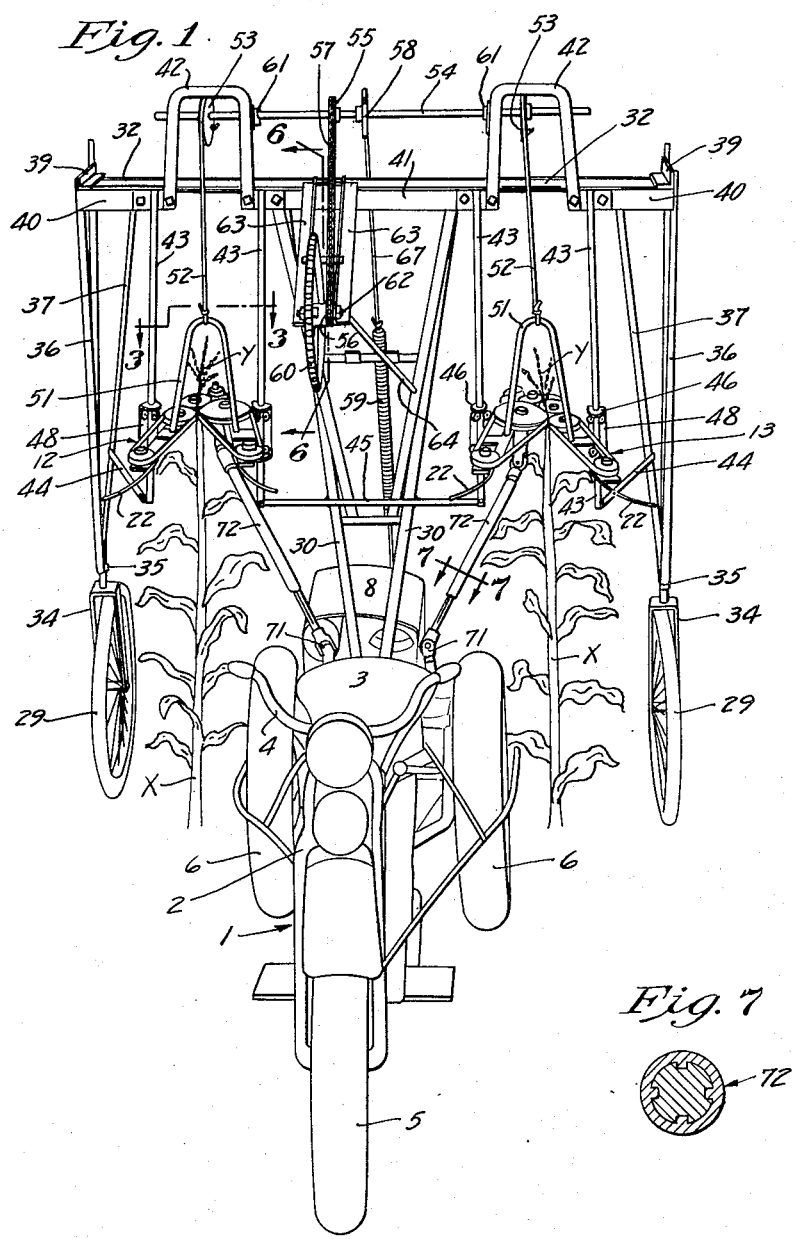

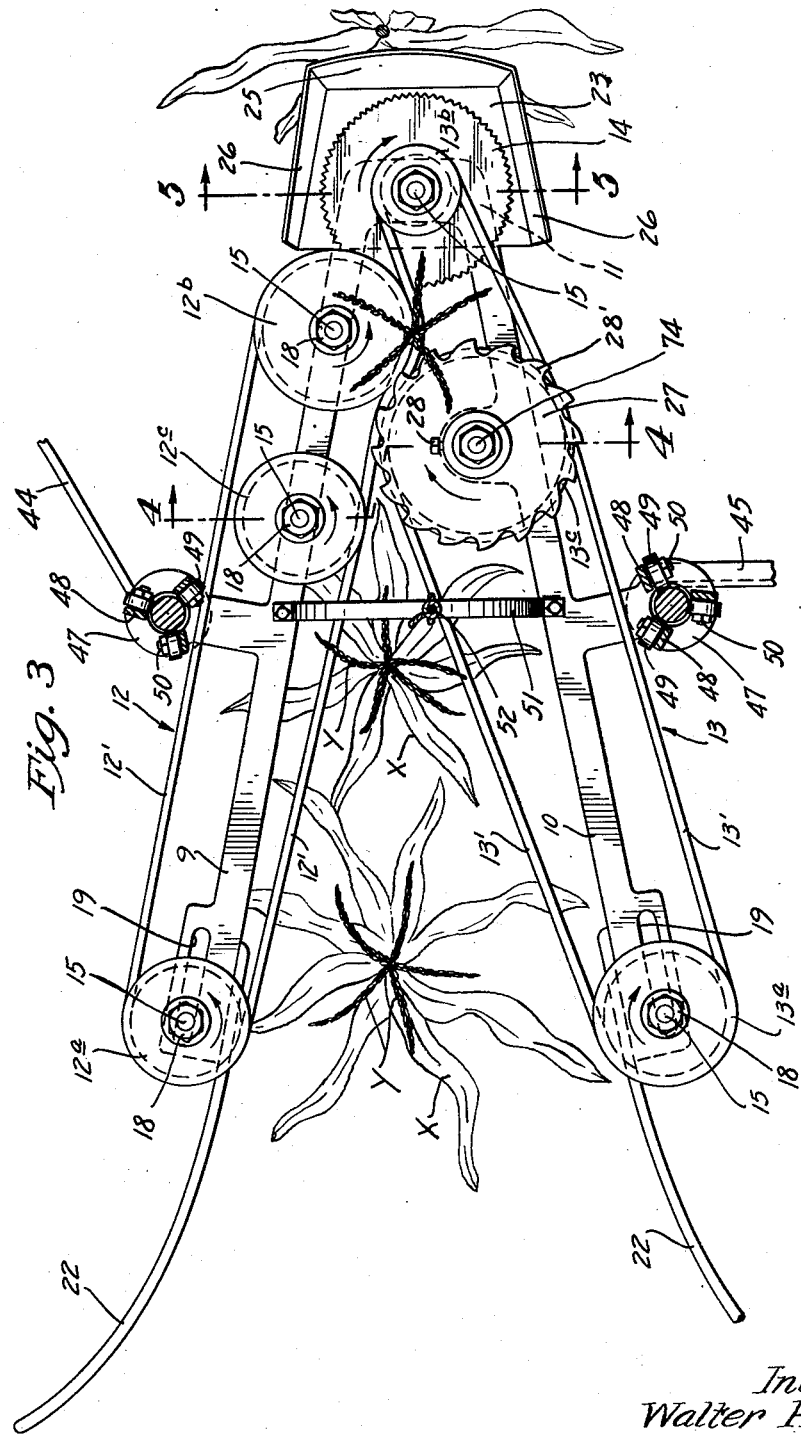

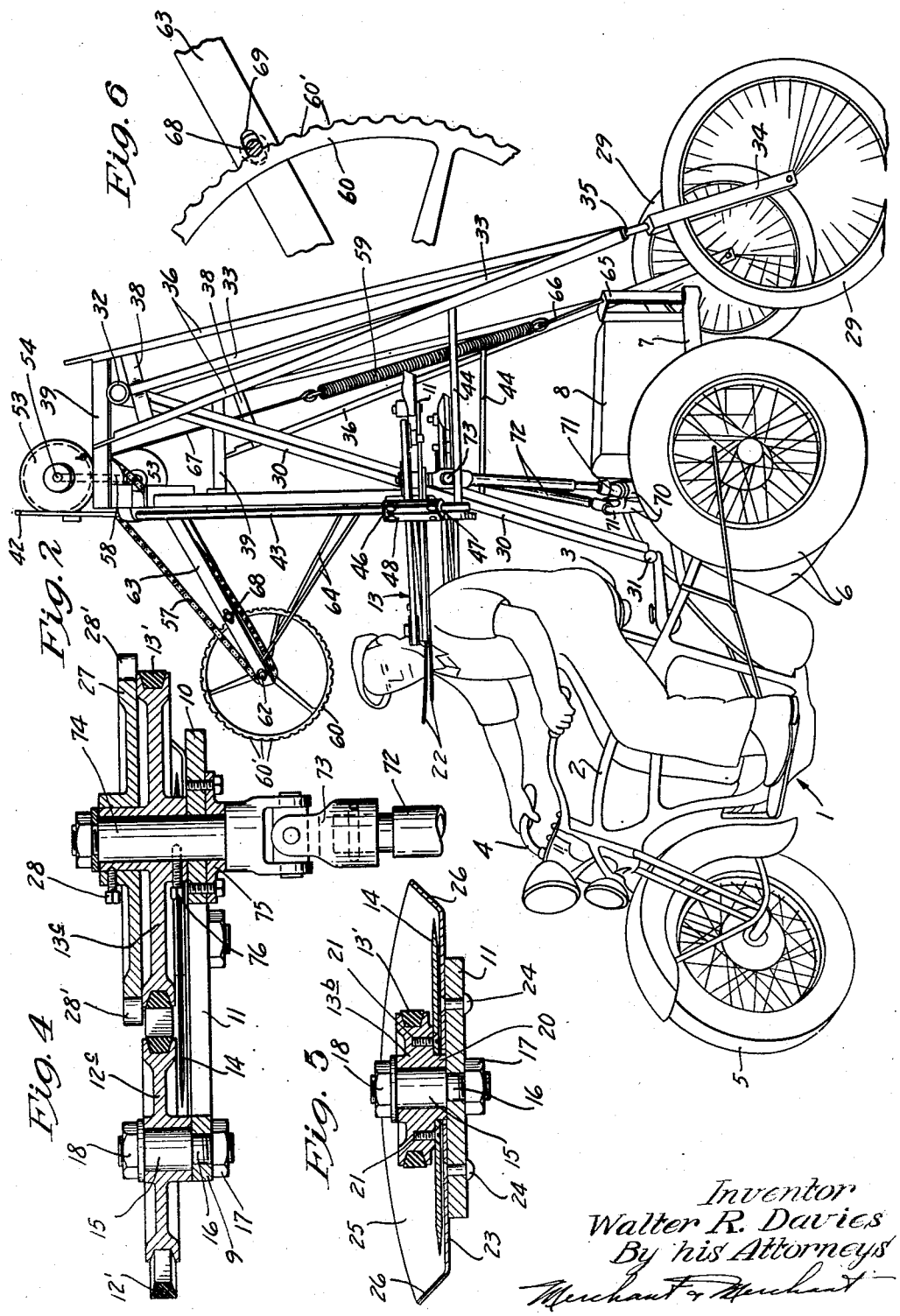
Oct. 17, 1950     W. R. DAVIES     2,526,543
CORN DETASSELING MACHINE
Filed Dec. 26, 1944     3 Sheets-Sheet 3
Inventor
Walter R. Davies
By his Attorneys
Merchant & Merchant Patented Oct. 17, 1950

UNITED STATES PATENT OFFICE 2,526,543

CORN DETASSELING MACHINE

Walter R. Davies, Shakopee, Minn., assignor to Northrup, King & Co., Minneapolis, Minn., a corporation of Minnesota Application December 26, 1944, Serial No. 569,875

9 Claims. (Cl. 56—15)

My present invention relates to improvements in machines adapted particularly for use in detasseling (removing the tassels from) various varieties of corn.

The detasseling of corn to prevent or control cross-pollination is a procedure practiced to a very wide extent particularly in connection with the raising of hybrid seed corn, and has hitherto been carried out largely, if not wholly, by hand pulling or cutting of the tassel from the main body of the corn stalk; it being understood that the tassel of the corn is the pollen-yielding growth at the extreme top of the corn stalk.

An object of the present invention is, therefore, the provision of a machine which, when moved through a corn field, will progressively cut off or otherwise remove the tassels from the upper ends of the corn stalks without injuring or disturbing any portion of the corn stalk below the plane of severance. In this connection, attention is directed to the fact that the present invention deals with the provision of automatic machinery for detasseling of corn for the purpose of controlling or influencing its growth, character, and seed-producing qualities, and has, of necessity, encountered and solved problems entirely foreign to harvesting machines, of which there are many examples in the prior art.

Another objective of the present invention is the provision of a machine having all the advantageous characteristics set out above, and which incorporates means whereby a plurality of laterally spaced parallel rows of corn may be automatically detasseled during a single run of the machine through a field.

A further object of the invention is the provision of a machine of the general character outlined above, wherein there are provided one or more gathering and cutting heads or units mounted or connected for vertical adjustments by the operator of the machine while the machine is moving through a field, so that corn stalks of different heights may be cut at the desired height to effectively remove the pollen-bearing portion of the tassel without impairing the remainder of the corn stalks. To this end, the present invention, in its preferred form illustrated, provides a narrow gauge power-driven vehicle (sometimes hereinafter referred to as a tractor) that is adapted to be driven down a lane formed between adjacent rows of corn. This power-driven vehicle or tractor pulls and partially supports a superstructure carrying a laterally spaced plurality of cutting and gathering heads, each adapted to function in connection with a different row of corn, and which superstructure spans adjacent rows of corn stalks and is further supported by wheels running down adjacent lanes. These wheels may hereinafter be referred to as "outboard wheels."

Still another object of the present invention is the provision of an improved power-driven gathering and severing head or unit which, as the machine travels in a straight line through a field, will efficiently gather in and feed to the cutter the tassel ends of successively encountered corn stalks of a common row, but which, corn stalks, may be somewhat staggered with respect to a straight line. To this end I provide, in the preferred embodiment of the invention herein illustrated, a plurality of cutting and gathering heads each comprising an elongated pair of endless conveyers arranged to form a rearwardly converging gathering mouth therebetween. These laterally adjacent endless conveyers normally run in face-to-face contact adjacent their rear end portions and are associated with the cutter that laps the engaged portions of the laterally adjacent conveyers. With this arrangement, a relatively wide gathering mouth is formed between the rearwardly converging outer face portions of adjacent conveyers whereby staggered corn stalks will be effectively drawn between the converging conveyers and guided to the point of convergence of the two conveyers. When the corn stalks reach the point of convergence of the opposite conveyers, they are squeezed tightly therebetween and fed with a positive action rearwardly to the cutter. Preferably, and in the preferred embodiment of the invention illustrated, the conveyers of the gathering and cutting heads are in the nature of resilient endless V-belts that run over V-groove pulleys. In connection with the preferred embodiment of the invention illustrated, it will also be seen that in such preferred arrangement the belts of opposite conveyers run in outer face to outer face contact about the peripheral portion of a pulley of one of the conveyers, and that the cutter laps the said arcuate portion of a pulley over which the belts of opposite conveyers run.

The above and many other important objects and advantages of the invention will be made apparent from the following specification, claims, and appended drawings.

In the accompanying drawings, like characters indicate like parts throughout the several views.

Referring to the drawings:

Fig. 1 is a front and top perspective view of a machine embodying the invention;

Fig. 2 is a side perspective view of the machine of Fig. 1;

Fig. 3 is an enlarged detail view of a cutter head and certain immediately associated parts taken on the section line 3—3 of Fig. 1 and looking downwardly;

Fig. 4 is an enlarged transverse sectional view taken on the line 4—4 of Fig. 3;

Fig. 5 is an enlarged transverse sectional view taken on the line 5—5 of Fig. 3;

Fig. 6 is an enlarged fragmentary view, with some parts broken away and some parts shown in section, taken on the line 6—6 of Fig. 1; and Fig. 7 is an enlarged sectional view taken on the line 7—7 of Fig. 1.

The main power-driven vehicle or tractor unit of the machine is indicated as an entirety by 1 and is a three-wheeled affair comprising a motorcycle type frame structure 2 having a customary operator's seat 3, handle bars 4, front wheel 5, and rear wheels 6; the rear wheels 6 being mounted on a common axle in such closely spaced relation as to permit the tractor to pass freely down a lane between adjacent rows of corn. The motorcycle type frame 2 is provided with a rearwardly extending auxiliary frame 7 carrying a suitable engine contained within a hood 8, and which has conventional driving connections, not shown, to the rear tractor wheels 6.

The machine herein illustrated carries right and left hand gathering and cutting heads which are laterally spaced to simultaneously operate on adjacent rows of corn. These cutting and gathering heads each comprise a V-shaped supporting frame structure having forwardly and outwardly converging arms 9 and 10 and an apex portion 11, a pair of elongated endless conveyers 12 and 13, and a cutter in the nature of a rotary knife or saw 14. The conveyers 12 and 13 each involve an endless conveyer element running over front, rear, and intermediate rotary guide elements. In the preferred embodiment of the invention illustrated, the endless conveyer elements are in the nature of more or less resilient V-belts and these run over rotary guide elements in the nature of V-groove pulleys. The endless V-belt of the conveyer 12 is indicated by 12' and the endless V-belt of the conveyer 13 is indicated by 13'. The front, rear and intermediate V-groove pulleys or rotary guide elements of the endless conveyer 12 are respectively indicated by 12a, 12b and 12c; and the front, rear and intermediate V-groove pulleys or rotary guide elements of the endless conveyer 13 are respectively indicated by 13a, 13b and 13c.

The pulley 13b of conveyer 13 of each gathering and cutting head unit is journalled on a stub shaft 15 having a reduced diameter lower end 16 that projects through the apex portion 11 of the V-shaped frame and is clamped rigidly in position by means of a suitable bolt 17. The stub shafts 15 are also provided with reduced diameter upper end portions to which are applied a suitable washer and a retainer nut 18. The pulleys 13a and 13c of conveyer 13 are journalled on similar nut-equipped stub shafts 15 anchored to the frame arms 10, and the pulleys 12a, 12b and 12c of the conveyer 12 are similarly anchored by stub shafts 15 to the frame arms 9. It is important to note, however, that stub shafts 15 of the front pulleys 12a and 13a of the conveyers 12 and 13 respectively have their reduced diameter lower ends anchored in forwardly and rearwardly extending slots 19 which permit belt tightening adjustments of the front pulleys 12a and 13a.

The rotary knives or saws 14 are provided with central apertures for reception of the hub portions 20 of their respective pulleys 13b and are anchored to said pulleys for common co-axial rotation therewith by screws, or the like, 21; and these rotary knives or saws 14 are of considerably greater diameter than their respective cooperating pulleys 13b.

Now by reference particularly to Fig. 3, it will be seen that the pulleys 13b and 13c of the conveyers 12 are so positioned with respect to the pulleys 13b and 13c of their cooperative conveyers 13, that the belts 12' will run in outer face contact with the belts 13' of their respective cooperative conveyers for part of their runs between their own pulleys 13c and 13b and for part of their runs around their own rear pulleys 12b. In other words, it will be seen that the belts 12' and 13' of each cutting and conveying unit run in outer face contact over arcuate portions of intermediate pulley 13c of conveyor 13 and over an arcuate portion of rear pulley 12b of conveyer 12. Now by further reference particularly to Figs. 3 and 4 it will be seen that the rotary knives or saws 14 underlap that arcuate portion of the rear pulleys 12b of conveyers 12 whereat the cooperating belts 12' and 13' run in face to face contact. Hence, it will be seen that the rearwardly converging gathering mouths formed between adjacent cooperating conveyer belts 12' and 13' are relatively wide at their front ends so that they will be very effective in gathering in the upper ends of corn stalks that are considerably staggered in relation to a straight line of movement of the machine through a field and will feed and guide such stalks to the point of convergence of the cooperating opposite belts at which points the stalks will be fed into the normally closed spaces between their opposite belts. At this point it should be clearly understood that the opposite belts 12' and 13' are driven, through connections hereinafter described, in directions producing rearward feed movement between the belts and at speeds producing rearward movement substantially equalling the speed of forward movement of the machine. With this arrangement, there will be substantially no forward or rearward movement imparted to the corn stalks as they are gripped tightly between opposite rearwardly moving portions or normally engaged portions of the belts. In this connection it is also important to bear in mind that the belts are of the conventional rubber and fabric composition which have sufficient resilience and elasticity to grip the corn stalks tightly therebetween without producing a shearing action in and of themselves. Of course, the corn stalks will be subject to the shearing action of the rotary knives or saws 14 while they are still firmly gripped between the normally engaged outer faces of cooperating belts 12' and 13', as will be seen best by reference to Fig. 3.

The elements 14 have been referred to as knives or saws because they are provided with fine teeth.

The outwardly diverging gathering mouths formed between the cooperating belts 12' and 13' are forwardly and outwardly extended by frame extensions 22 that are anchored fast to the forward end portions of arms 9 and 10.

In the preferred form illustrated, the gathering and cutting heads are provided with knife guards 23 that are anchored by rivets, or the like, 24 to the apex portions 11 of the V-shaped frames below the rotary knives 14 and which are provided with up-turned flanges 25 rearwardly of the knives and up-turned flanges 26 at the sides of the knives 14. By reference particularly to Fig. 3 it will be seen that these knife guards 23 forwardly terminate well back of the cutting zone so that they do not interfere with the cutting actions of the knives or saws 14.

Also in the preferred embodiment of the invention, illustrated, it will be noted that the rotary guide elements or pulleys 13c of the conveyers 13 are equipped with toothed feeding wheels 27 that are telescoped over the upper hubs of said pulleys 13c and are anchored thereto for common rotation therewith by set screws 28. These toothed feeding wheels 27 have teeth 28' that overlap the arcuate lines of contact of the outer faces of adjacent belts 12' and 13' and serve to engage corn stalks and positively feed the same into the normally closed spaces between the adjacent cooperating belts 12' and 13'.

As previously indicated, the gathering and cutting heads, just above described, are vertically adjustably supported from a super structure that has its front end portion mounted on and supported from the tractor 1 and its rear end portion supported from a pair of "outboard" wheels. These so-called outboard wheels, indicated by 29, are spaced from the longitudinal center of the tractor, a distance approximately equal to the space between adjacent rows of corn, so that the said wheels 29 will run down the centers of corn field lanes adjacent the lane traversed by the tractor 1. The super structure carrying the gathering and cutting heads is, in fact, in the nature of a trailer pulled and partially supported by the tractor unit and comprises an upwardly and rearwardly diverging pair of frame members 30 connected to the tractor 1 through the medium of a ball and socket joint 31, shown best in Fig. 2. The upper ends of the frame members 30 are secured fast to a tubular cross member 32 to the outer ends of which are rigidly secured rearwardly depending tubular leg-acting frame elements 33. The so-called outboard wheels or trailer wheels 29 are equipped with forks 34 similar to those employed on the front wheels of bicycles, and these forks are rigidly anchored to the lower ends of the leg-acting frame elements 33 at 35. To add further rigidity to the depending leg-acting frame elements 33, there are provided upwardly converging frame elements 36 (see Fig. 2), and laterally inwardly and upwardly converging frame elements 37 (see Fig. 1). The frame elements 36 and 37 are welded to the lower ends of the tubular leg-acting frame elements 33 and at their upper ends said elements 36 and 37 are welded or otherwise rigidly secured to the tubular cross member 32. Standing between the upper end portions of the frame elements 36 and welded thereto and to the tubular cross member 32 are forwardly and rearwardly extending braces 38. The extreme upper ends of the frame elements 36 extend above the tubular cross member 32 and are welded or otherwise rigidly secured to forwardly and rearwardly extending supporting beams 39. The forwardly projected ends of the supporting beams 39 are cross connected by a transverse cross member comprising transverse end sections 40, a transverse intermediate section 41, and downwardly opening vertically disposed yokes 42, all of which parts are rigidly connected together by welding in addition to the bolts shown. The transverse centers of the yokes 42 are spaced equal to the space between adjacent rows of corn in a field to be cut.

Depending from the transverse cross member last described and rigidly connected thereto at their upper ends, preferably by welding or brazing, are guideway-forming bars or rods 43 of which there are two pairs. The lower ends of the outer guide rods 43 are cross-connected to the frame elements 37 by braces 44, and the lower ends of the inner guide rods 43 are tied together and to the frame elements 30 by a tie bar 45, the latter being preferably welded to the elements 30.

The gathering and cutting heads are mounted for vertical adjustments on the guideway-forming rods 43 through the medium of guides each comprising an upper plate 46 (see Figs. 1 and 2) and lower plate 47 (see Fig. 3), uprights 48 connecting the upper and lower plates 46 and 47 and guide rollers 49. The lower plates 47 of the guides are, preferably and as shown, formed integrally with and as outward extensions of the arms 9 and 10 of the cutting and gathering head frames, and these and the upper plates 46 are provided with apertures that loosely receive the guideway-forming rods 43. The uprights 48 are welded or otherwise rigidly secured to the upper and lower plates 46 and 47, and the rollers 49 are journalled to the intermediate portions of these uprights 48 by nut-equipped bolts, or the like, 50 (see Fig. 3), and these engage the guideway-acting rods 43 at points spaced 120° apart about the circumferences of said rods 43.

For the purpose of vertically adjusting the gathering and cutting heads on their respective cooperating pairs of guideways 43, there is provided an elevator mechanism comprising vertically disposed downwardly opening yokes 51, cables 52, sheaves 53, cross shaft 54, chain sprockets 55 and 56, chain 57, a sheave 58 and counterbalanced spring 59, and a hand operating wheel 60. The opposite legs of each inverted yoke 51 are rigidly anchored to an opposite arm 9 or 10 of a V-shaped cutting head frame and span the gathering mouths formed between the cooperating endless belts 12' and 13'; said yokes being of sufficient height to permit free passage of the tassels to be cut. The upper ends of the yokes 51 are connected by the cables 52 to the sheaves 53. In fact, the cables 52 work in grooves in the sheaves 53 and have their extreme upper ends anchored to the sheaves 53 so that said cables 52 will be wound on or unwound from the sheaves 53 under rotation of the latter. The sheaves 53 are in turn mounted fast on the shaft 54 which is journalled in suitable bearings 61 on the yokes 42. The sprocket 55 is also mounted fast on the cross shaft 54, and the chain sprocket 56 is mounted fast on the hub of the hand wheel 60 and is journalled in common with said hand wheel on a nut-equipped bolt 62 extending between forwardly and downwardly projecting frame arms 63. The frame arms 63 are rigidly anchored at their upper ends to the structural element 41 and at their lower ends are connected to the structural elements 30 by braces 64. The lower end of counterbalanced spring 59 is anchored to the frame extension 7 through a yoke 65 and eye bolt 66. While the upper end of said spring 59 is connected to grooved sheave 58 through a cable 67, the cable 67 runs over the groove periphery of sheave 58 in the opposite direction from the direction that cables 52 run over sheaves 53 and is suitably anchored at its end to said sheave 58. The tension of spring 59 is preferably adjusted so as to nearly but not quite overcome the combined weight of the two gathering and cutting heads which may now be elevated by the mechanism described through manipulation of hand wheel 60 and will be lowered through the action of gravity when relieved of lifting tension by said elevator mechanism.

In order to lock the lifting mechanism against accidental movements, I provide a sort of ratchet lock in the nature of a bolt 68 working in longitudinally extending slots 69 in the forwardly extending frame arms 63. Due to the downward inclination of the frame arms 63 and slot 69, the said bolt 68 is gravity pressed toward the periphery of hand wheel 60 and to become seated in circumferentially spaced notches 60' in the periphery of said wheel 60. This locking action is sufficient to prevent accidental lowering of the gathering and cutting heads but will be overcome when manual force is applied to the operating hand wheel 60.

In the preferred embodiment of the invention illustrated the driving of the conveyer belts 12' and 13' and the rotary knives 14 is accomplished through power driving connections directly coupled to the intermediate pulleys 13c of the conveyers 13. These preferred driving connections comprise upwardly extending drive shafts 70, universal joints 71, coupling shaft 72, upper universal joints 73 and journalled shafts 74. The upwardly extending short drive shafts 70 are driven from the tractor's engine through power transmitting connections, not shown, at a predetermined speed with respect to vehicle ground speed. The shaft section 74 is journalled in suitable bearings 75 on the frame arms 10 and are locked to the hubs of pulleys 13c of conveyers 13 by set screws, or the like, 76. By reference particularly to Fig. 4 it will be seen that the pulleys 13c of conveyers 13 are mounted on the upwardly projecting ends of shaft elements 74 and that the toothed feeding wheels 27 are, in turn, mounted on the upwardly projecting hub portions of said pulleys 13c and are locked thereto for common rotary movement by the set screws 28.

It will now be evident that the positively driven intermediate pulleys 13c of conveyers 13 directly drive the conveyer belts 13' of conveyers 13 which, in turn, run over and drive the pulleys 13a and 13b of conveyers 13, and it will be further evident that the conveyer belts 12' and pulleys 12a, 12b and 12c of conveyers 12 are driven by frictional engagement between the outer faces of belts 12' and 13'. Hence, it is important that the pulleys 12b and 12c of conveyers 12 be so positioned as to cause cooperating belts 12' and 13' to run in contact for an arcuate distance of considerable length about the intermediate pulleys 13c of conveyers 13.

*Operation*

In use the machine illustrated is driven to the edge of a field of corn with the tractor 1 and directed straight down a lane between adjacent rows of born stalks, and at this point the operator, through manipulation of the hand wheel 60, will adjust the conveying and cutting heads of heights whereat the rotary cutters 14 will intersect the upper portions of the corn stalk, X, at the bases of the pollen-bearing tassels Y thereof. Usually the corn in any particular field, and particularly the corn in a well cared for field of hybrid seed corn, will be of sufficiently uniform height to make further adjustments of the cutter heads unnecessary while working in that particular field. However, such further adjustments as may be necessary will usually be of more or less minor character and may easily be made by the operator while the machine is moving through the field. With the adjustments thus made, the tractor element is driven successively straight through the lanes between adjacent rows of corn which will successively bring the tassel portions Y of the corn stalks of two adjacent rows between the conveyer belts of opposite gathering and cutting heads and past the rotary cutters 14 thereof where the latter will be sheared off and be permitted to fall to the ground. Of course, the trailer-like superstructure spans these adjacent rows of corn stalks and is supported at its rear by the so-called outboard wheels 29 which run down the lanes at the outsides of the corn stalks being cut.

It should be noted that the coupling shaft 72 is made up of telescopically engaged splined sections which permit longitudinal sliding movement while maintaining positive driving engagement between the telescopically engaged sections, see particularly Fig. 7. These connections and the universal joints described permit the trailer-acting superstructure to move freely with respect to the tractor structure as the machine moves over the regular terrain.

What I claim is:

1. In a corn detasseling machine, a laterally adjacent pair of cooperating endless conveyors, said conveyors each comprising front and rear pulleys and an endless belt running over said pulleys, one of said conveyors further comprising an intermediate pulley over which its belt runs, the rear pulley of the other conveyor being located forwardly of the rear pulley of the cooperating conveyor and rearwardly of the intermediate pulley of said cooperating conveyor and having its periphery in overlapping relation to a straight line drawn between the belt-engaging peripheral portions of the rear and intermediate pulleys of said cooperating conveyor, whereby the outer faces of the endless belts of adjacent conveyors will run in arcuate face to face contact about a peripheral portion of the said rear pulley of the other conveyor and about a peripheral portion of the said intermediate pulley of the cooperating conveyor, the adjacent faces of the belts of the opposite cooperating conveyors diverging forwardly and outwardly from the place of face to face contact to provide a rearwardly converging gathering mouth therebetween leading to said place of face to face contact, and mechanism driving said conveyors in directions to produce rearward movement of the adjacent faces of opposite belts.

2. In a corn detasseling machine, a laterally adjacent pair of cooperating endless conveyors, said conveyors each comprising front and rear pulleys and an endless belt running over said pulleys, one of said conveyors further comprising an intermediate pulley over which its belt runs, the rear pulley of the other conveyor being located forwardly of the rear pulley of the cooperating conveyor and rearwardly of the intermediate pulley of said cooperting conveyor and having its periphery in overlapping relation to a straight line drawn between the belt-engaging peripheral portions of the rear and intermediate pulleys of said cooperating conveyor, whereby the outer faces of the endless belts of adjacent conveyors will run in arcuate face to face contact about a peripheral portion of the said rear pulley of the other conveyor and about a peripheral portion of the said intermediate pulley of the cooperating conveyor, the adjacent faces of the belts of the opposite cooperating conveyors diverging forwardly and outwardly from the place of face to face contact to provide a rearwardly converging gathering mouth therebetween leading to said place of face to face contact, and mechanism driving one of said conveyor belts in a direction to produce rearward motion of the face thereof adjacent the other conveyor belt, said other conveyor belt being frictionally driven by said face to face contact with the first said conveyor belt.

3. In a corn detasseling machine, a laterally adjacent pair of cooperating endless conveyors, said conveyors each comprising front and rear pulleys and an endless belt running over said pulleys, one of said conveyors further comprising an intermediate pulley over which its belt runs, the rear pulley of the other conveyor being located forwardly of the rear pulley of the cooperating conveyor and rearwardly of the intermediate pulley of said cooperating conveyor and having its periphery in overlapping relation to a straight line drawn between the belt-engaging peripheral portions of the rear and intermediate pulleys of said cooperating conveyor, whereby the outer faces of the endless belts of adjacent conveyors will run in arcuate face to face contact about a peripheral portion of the said rear pulley of the other conveyor and about a peripheral portion of the said intermediate pulley of the cooperating conveyor, the adjacent faces of the belts of the opposite cooperating conveyors diverging forwardly and outwardly from the place of face to face contact to provide a rearwardly converging gathering mouth therebetween leading to said place of face to face contact, and mechanism driving the said intermediate pulley of one of the cooperating conveyors to thereby directly drive the belt of that conveyor, the belt of the other conveyor being frictionally driven by said face to face contact with its cooperating conveyor belt.

4. In a corn detasseling machine, a laterally adjacent pair of cooperating endless conveyors, said conveyors each comprising front and rear pulleys and an endless belt running over said pulleys, one of said conveyors further comprising an intermediate pulley over which its belt runs, the rear pulley of the other conveyor being located forwardly of the rear pulley of the cooperating conveyor and rearwardly of the intermediate pulley of said cooperating conveyor and having its periphery in overlapping relation to a straight line drawn between the belt-engaging peripheral portions of the rear and intermediate pulleys of said cooperating conveyor, whereby the outer faces of the endless belts of adjacent conveyors will run in arcuate face to face contact about a peripheral portion of the said rear pulley of the other conveyor and about a peripheral portion of the said intermediate pulley of the cooperating conveyor, the adjacent faces of the belts of the opposite cooperating conveyors diverging forwardly and outwardly from the place of face to face contact to provide a rearwardly converging gathering mouth therebetween leading to said place of face to face contact, a toothed feeding wheel mounted for common coaxial rotation with the said intermediate pulley of one of said conveyors, said toothed feeding wheel being closely adjacent the said intermediate pulley and being of such diameter that the feeding teeth thereof will lap the arcuate line of contact between the belts of opposite conveyors as they run about the said intermediate pulley, and mechanism driving said conveyors in directions to produce rearward movement of adjacent faces of opposite belts, said toothed feeding wheel serving to positively force corn stalks between the conveyors at the place of normal face to face contact.

5. In a corn detasseling machine, a laterally adjacent pair of cooperating endless conveyors, said conveyors each comprising front and rear pulleys and an endless belt running over said pulleys, one of said conveyors further comprising an intermediate pulley over which its belt runs, the rear pulley of the other conveyor being located forwardly of the rear pulley of the cooperating conveyor and rearwardly of the intermediate pulley of said cooperating conveyor and having its periphery in overlapping relation to a straight line drawn between the belt-engaging peripheral portions of the rear and intermediate pulleys of said cooperating conveyor, whereby the outer faces of the endless belts of adjacent conveyors will run in arcuate face to face contact about a peripheral portion of the said rear pulley of the other conveyor and about a peripheral portion of the said intermediate pulley of the cooperating conveyor, the adjacent faces of the belts of the opposite cooperating conveyors diverging forwardly and outwardly from the place of face to face contact to provide a rearwardly converging gathering mouth therebetween leading to said place of face to face contact, a toothed feeding wheel mounted for common coaxial rotation with the said intermediate pulley of one of said conveyors, said toothed feeding wheel being closely adjacent the said intermediate pulley and being of such diameter that the feeding teeth thereof will lap the arcuate line of contact between the belts of opposite conveyors as they run about the said intermediate pulley, and mechanism driving said conveyors in directions to produce rearward movement of adjacent faces of opposite belts, said toothed feeding wheel serving to positively force corn stalks between the conveyors at the place of face to face contact, the said driving mechanism comprising power transmission connections directly to the said intermediate pulley and toothed wheel.

6. The structure defined in claim 1 in further combination with a cutter arranged to intersect and cut corn stalks as they are moved rearwardly by and are gripped between the normally engaged faces of the adjacent belts.

7. The structure defined in claim 4 in further combination with a cutter arranged to intersect and cut corn stalks as they are moved rearwardly by and are gripped between the normally engaged faces of the adjacent belts.

8. In a corn detasseling machine, a laterally adjacent pair of cooperating endless conveyors, said conveyors each comprising front and rear pulleys and an endless belt running over said pulleys, the rear pulley of one conveyor being located forwardly of the rear pulley of the cooperating conveyor and having its periphery in overlapping relation to a straight line drawn between the adjacent belt-engaging peripheral portions of the front and rear pulleys of the cooperating conveyor, whereby the outer faces of the endless belts of adjacent conveyors will run in arcuate face to face contact about a peripheral portion of the rear pulley of said one conveyor, the adjacent faces of the belts of opposite conveyors diverging forwardly and outwardly from the place of face to face contact toward their front pulleys to provide a rearwardly converging gathering mouth therebetween leading to said place of face to face contact, and mechanism driving said conveyors in directions to produce rearward movement of the adjacent faces of opposite belts.

9. The structure defined in claim 8 in further combination with a cutter arranged to intersect and cut corn stalks as they are moved rearwardly by and are gripped between the normally-engaged faces of adjacent belts.

WALTER R. DAVIES.

REFERENCES CITED

The following references are of record in the file of this patent:

UNITED STATES PATENTS

| Number | Name | Date |
| --- | --- | --- |
| 903,666 | Becerra | Nov. 10, 1908 |
| 1,090,802 | Thomas et al. | Mar. 17, 1914 |
| 1,194,660 | Piatt | Aug. 15, 1916 |
| 1,228,200 | Freeman et al. | May 29, 1917 |
| 1,295,651 | Wells | Feb. 25, 1919 |
| 1,457,827 | Erb | June 5, 1923 |
| 1,909,909 | Struebing | May 16, 1933 |
| 1,925,975 | Benner | Sept. 5, 1933 |
| 2,095,007 | Pfister | Oct. 5, 1937 |
| 2,139,883 | Curry | Dec. 13, 1938 |
| 2,380,161 | Flook | July 10, 1945 |
| 2,435,334 | Wurtele | Feb. 3, 1948 |